(12) United States Patent
Carvajal et al.

(10) Patent No.: US 8,605,219 B2
(45) Date of Patent: Dec. 10, 2013

(54) TECHNIQUES FOR IMPLEMENTING A CURSOR FOR TELEVISIONS

(75) Inventors: Victor Carvajal, San Marcos, CA (US); Jaime Chee, San Diego, CA (US); Lin Jun Wong, Escondido, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 573 days.

(21) Appl. No.: 12/269,028

(22) Filed: Nov. 11, 2008

(65) Prior Publication Data

US 2010/0118210 A1 May 13, 2010

(51) Int. Cl.
*H04N 5/50* (2006.01)

(52) U.S. Cl.
USPC ............ 348/569; 345/157; 715/856; 715/862

(58) Field of Classification Search
USPC ............. 348/211.99, 569, 570, 564; 345/156, 345/157; 715/719, 771, 863, 856, 862
See application file for complete search history.

(56) References Cited

U.S. PATENT DOCUMENTS

| 5,664,128 | A * | 9/1997 | Bauer ............................ 715/708 |
| 6,567,070 | B1 * | 5/2003 | Light et al. .................... 345/157 |
| 6,975,301 | B2 | 12/2005 | Fan |
| 7,443,381 | B2 | 10/2008 | Mo |
| 2004/0095317 | A1 | 5/2004 | Zhang et al. |
| 2005/0162397 | A1 | 7/2005 | Kwon et al. |
| 2006/0118706 | A1 * | 6/2006 | Hisakawa et al. ............. 250/221 |
| 2006/0262116 | A1 | 11/2006 | Moshiri et al. |
| 2007/0132729 | A1 * | 6/2007 | Son et al. ....................... 345/160 |
| 2007/0139172 | A1 | 6/2007 | Watanabe et al. |
| 2007/0157232 | A1 * | 7/2007 | Dunton et al. .................. 725/37 |
| 2007/0188449 | A1 * | 8/2007 | Choi et al. ..................... 345/157 |
| 2007/0266418 | A1 | 11/2007 | Lin |
| 2008/0184163 | A1 * | 7/2008 | White et al. ................... 715/798 |
| 2008/0235737 | A1 | 9/2008 | Read |
| 2009/0113354 | A1 * | 4/2009 | Yun et al. ....................... 715/863 |

FOREIGN PATENT DOCUMENTS

| EP | 1 760 573 | 8/2006 | |
| JP | 2006211125 | 8/2006 | |
| KR | 100796778 B1 * | 1/2008 | ............... H04N 5/44 |
| KR | 1020080006168 | 1/2008 | |
| WO | 2005/067284 | 7/2005 | |
| WO | 2005074565 | 8/2005 | |

OTHER PUBLICATIONS

RF Remotes. http://www.soundonsound.com/sos/sep03/articles/pcmusician.htm?print=yes, Sep. 2003.

(Continued)

*Primary Examiner* — Michael Lee
(74) *Attorney, Agent, or Firm* — John L. Rogitz

(57) ABSTRACT

Techniques include outputting a graphical user interface including a widget and any combination of objects on a television. Thereafter one or more key events may be received from a remote control. The graphical user interface can be updated by moving the widget in response to each direction key activation if the one or more key events indicate activation of one or more direction keys on the remote control. In addition, a function designated by a given object may be initiated in response to the activation of the enter key if the widget is determined to be proximate the given object.

19 Claims, 5 Drawing Sheets

(56) References Cited

OTHER PUBLICATIONS

Kautzner, M.; Scheller, A.; Stolp, R. PC Applications Conquer The TV Domain. http://ieeexplore.ieee.ofg/Xplore/login.jsp?url=/iel5/8828/27950/01248225.pdf?arnumber=1248225. vol. 2, Issue 22-24, pp. 389-392, Sep. 2003.

Oregon Networks. TV Web Browser & UI. http://oregan.net/tv_web_browser_and_ui.php, May 2008.

* cited by examiner

TECHNIQUES FOR IMPLEMENTING A CURSOR FOR TELEVISIONS

BACKGROUND OF THE INVENTION

The conventional television is being connected to an ever increasing number of content sources. In addition, the graphical user interfaces displayed on the television for selecting and controlling the various content sources and the television is presenting an ever increasing amount of information. Furthermore, there is a continued desire to be able to control the television and the various content sources through more diverse graphical user interfaces with a conventional remote control to improve the user experience. Therefore, there is a continuing need for improved techniques for controlling the television and various content sources using a remote control.

SUMMARY OF THE INVENTION

Embodiments of the present technology are directed toward techniques for implementing a cursor or other similar widget on televisions. In one embodiment, a system for implementing a cursor on a television includes a remote control and a video processing unit. The remote control generates key events in response to activation of one or more keys by a user. The video processing and control unit outputs a graphical user interface including a widget on the television. The video processing and control unit causes the widget to move in the graphical user interface in response key events indicating activation of the direction key of the remote.

In another embodiment, a method includes outputting a graphical user interface include a widget and a plurality of objects on a television. The graphical user interface is updated by moving the widget a fixed distance in response to each direction key activation on a remote. In addition, a function designated by a given object may be initiated in response to the activation of an enter key, if it is determined that the widget is proximate the given object at the time the enter key is activated.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
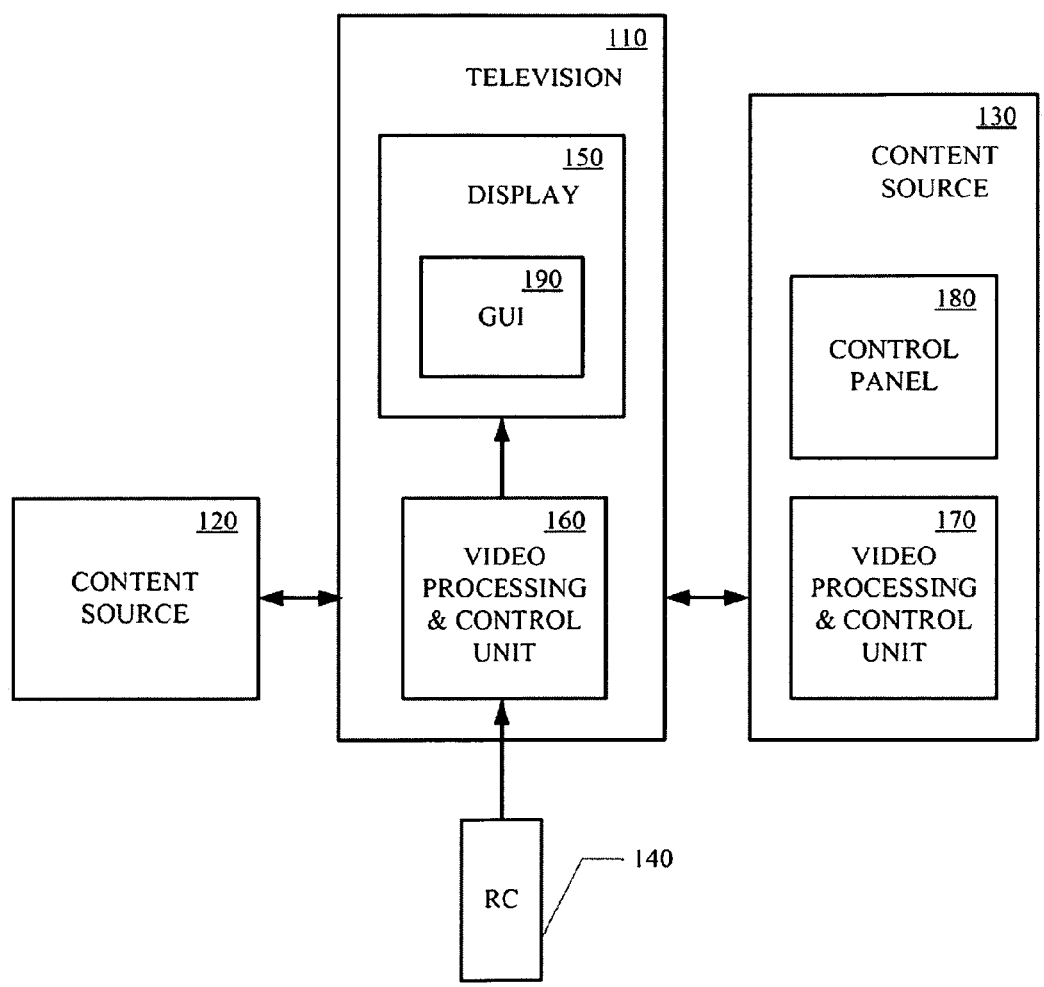
FIG. 1 shows a block diagram of a system for implementing a widget feature for televisions through the use of a remote control, in accordance with one embodiment of the present technology.

FIG. 1 shows a system for implementing a widget feature for televisions through the use of a remote control, in accordance with one embodiment of the present technology. The system 100 includes a television 110, one or more content sources 120, 130, and one or more remote controls 140. The television includes a display 150 and optionally a video processing and control unit 160. One or more content sources 120, 130 may also include a video processing unit and control unit 170. Accordingly, video processing and control units 160, 170 may be implemented in or distributed across any combination of the television and/or content sources. Each video processing and control unit 160, 170 may be implemented in hardware, firmware, and/or by software and a microprocessor (e.g., computing device executable commands and data that when executed by a processing unit implement one or more functions including the described herein).

The one or more content sources 120, 130 may include a cable set top box (STB), satellite receiver, a digital video disk (DVD) player, a digital video recorder (DVR), a video cassette recorder (VCR), a game console, a hard disk drive (HDD), or the like. The input interfaces of the system 100 include the remote control 140 and one or more interfaces such as a keyboard, control panel 180 of a content source, and/or the like. The remote control 140 may be a device independent controller (e.g., universal remote control), or may be associated with one or more devices such as the television 110, a given content source 120, 130 or the like. In addition, the remote control 140 may control a single device or control a plurality of devices. The remote control includes a plurality of directional keys, an enter key and any number of other keys, such as alpha numeric key pad, content source specific and/or device agnostic control keys, and/or the like. The directional keys typically include up, down, left and right keys. The directional keys may also include up-left diagonal, up-right diagonal, down-right diagonal, and down-left diagonal keys. Alternatively, the remote controller 140 may include a multifunctional "navigation" key providing up, down, left and right directional signals and optionally also diagonal directional signals, depending upon the localized activation of the navigation key.

Figure 2:
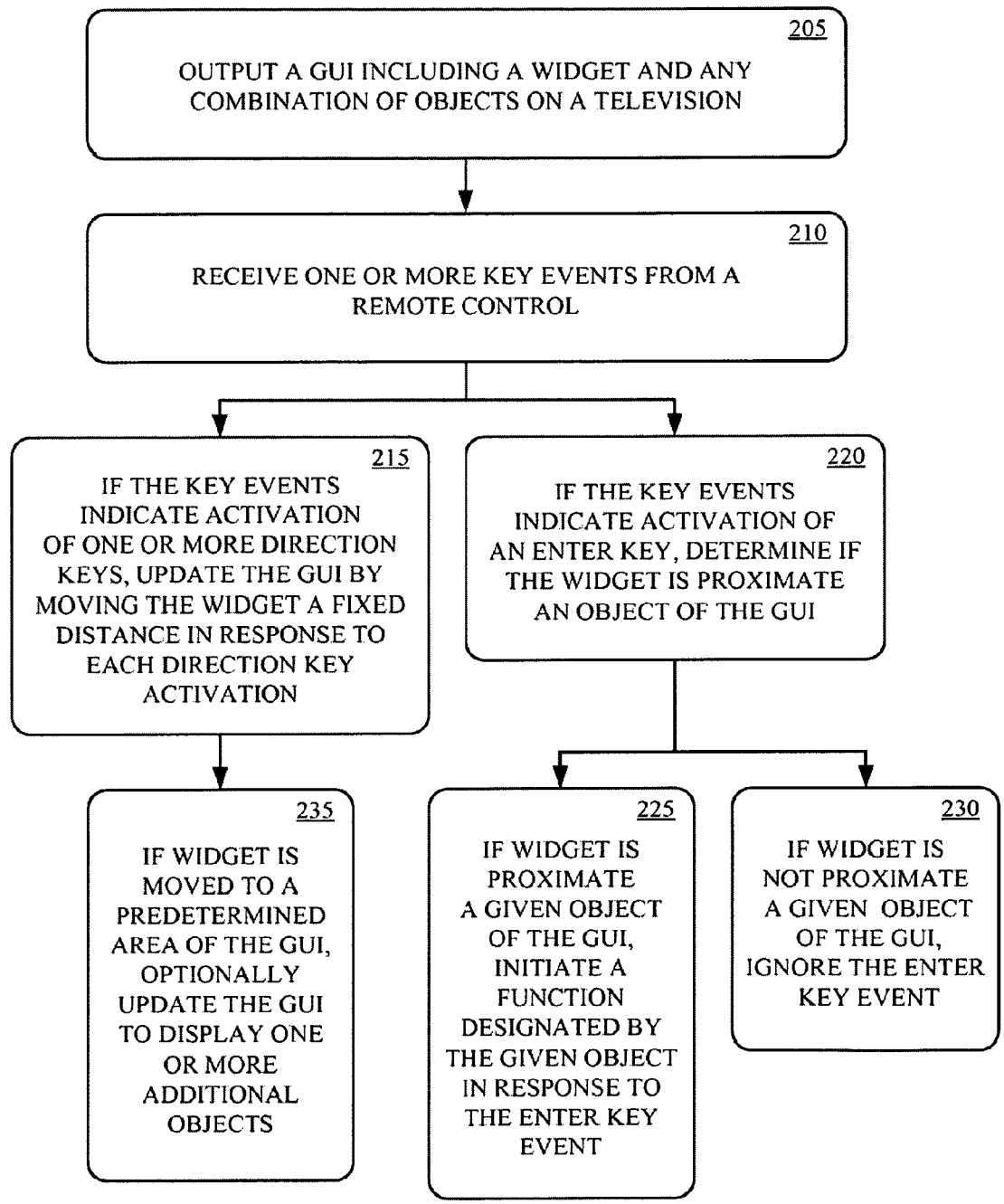
FIG. 2 shows a flow diagram of a method of implementing a widget feature for televisions through the use of a remote control, in accordance with one embodiment of the present technology.
Figure 3:
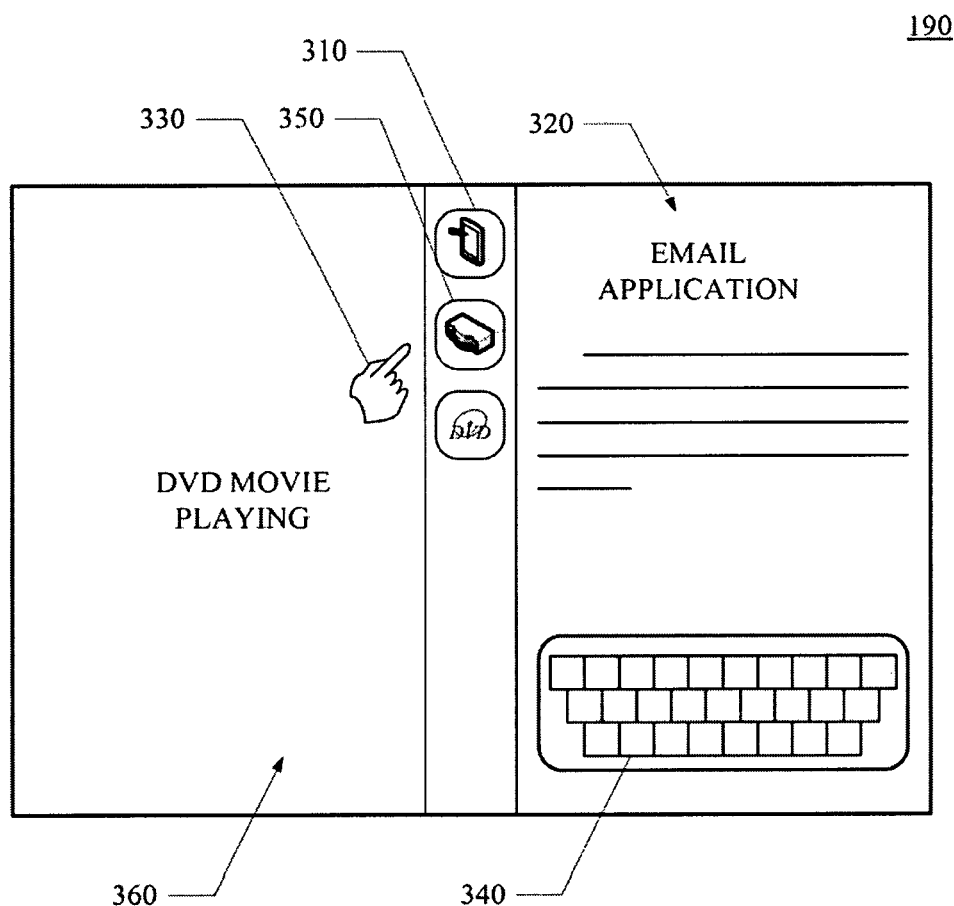
FIG. 3 shows an exemplary graphical user interface, in accordance with one embodiment of the present technology.

Operation of the system 100 will be further described with reference to FIG. 2, which shows a method of implementing a widget feature for televisions 110 through the use of a remote control 140. At 205, a graphical user interface 190 is output by a video processing and control unit 160, 170 on the display 150. An exemplary graphical user interface 190 is illustrated in FIG. 3. The graphical user interface 190 may include any combination of menus, sub-menus, icons 310, application windows 320, thumbnails, control bars and/or the like. The graphical user interface 190 also includes a widget such as a cursor 330, which may be customizable by the user.

At 210, the given video processing and control unit 160, 170, generating the graphical user interface 190, receives one or more key events from the remote control 140 in response to activation of one or more keys of the remote control 140 by a user. If the one or more key events indicate activation of one or more directional keys, the given video processing and control unit 160, 170 updates the graphical user interface 190 by moving the widget a fixed distance in response to each discrete activation of a given directional key in a given direction corresponding to each activation of the given directional key, at 215. In addition, if the one or more key events indicate that a given directional key is being held down, the widget may move in a continuous motion in the given direction corresponding to the given directional key. The distance the widget moves is proportional to the time that the given direction key is held down.

At 220, if the one or more key events indicate activation of an "enter" key, the given video processing and control unit 160, 170, generating the graphical user interface 190, determines if the widget is proximate the location of a menu item, icon, thumbnail or the like object of the graphical user interface 190. If the widget is proximate an object, the video processing and control unit 160, 170 will initiate the function designated by the given object in response to the "enter" key event, at 225. If the video processing and control unit 160, 170 determines that the widget is not proximate an object, the key event can be ignored, at 230.

In addition, if the widget is moved to a predetermined area on the display in response to process 215, the graphical user interface may be updated to display one or more menus, sub-menus, icons, thumbnails and/or the like associated with the predetermined area at 235. For example, if the widget is moved to a lower portion of the display on which a DVD is playing, a video playback control panel may be displayed in the lower portion. Furthermore, the layout of the graphical user interface may be customized. For example, if one or more key events indicate that the "enter" key is being held down while one or more other key events indicate that one or more direction keys are being activated, the object proximate the widget may be moved in the direction corresponding to the activation of the one or more given directional keys such that the object is repositioned on the graphical user interface.

As depicted in FIG. 3, the user may activate one or more directional keys on the remote 140 to navigate the cursor 330 over a set of icons representing a keyboard 340 in an email application and then use a combination of directional key and "enter" key activations proximate applicable letters of the keyboard to type an email. In other instances, the user may activate one or more directional keys to navigate the cursor 330 over an icon representing a game console 350 and then activate the "enter" key to bring up a menu for initiation operation of the game console. In yet another instance, the user may activate one or more directional keys on the remote 140 to navigate the cursor 330 to a lower portion of a window in which a DVD movie is playing 360 to cause a video playback control bar (not shown) to be overlaid in the lower portion of the DVD movie, which can then be used to control play back of the movie.

Figure 4A:
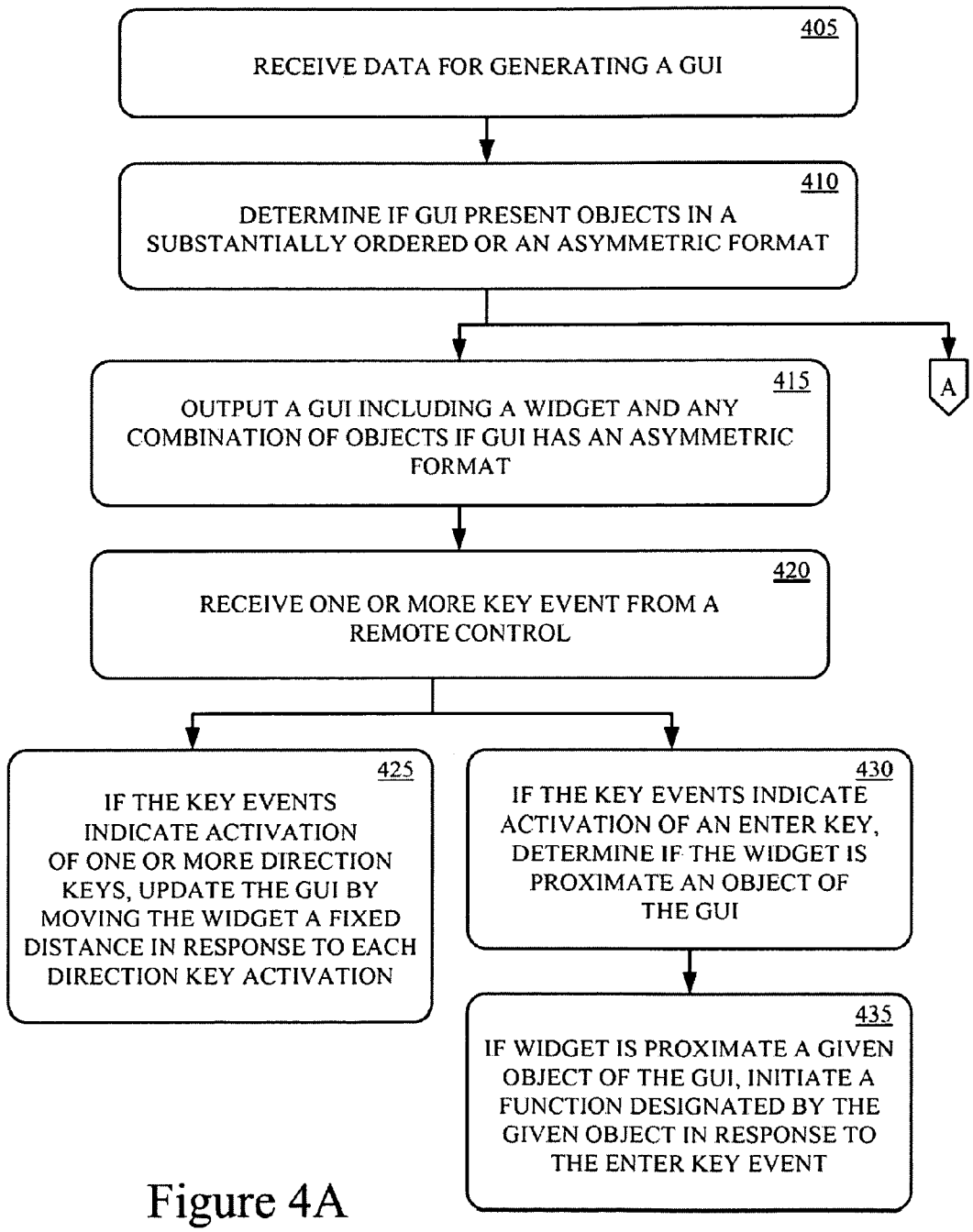
FIGS. 4A and 4B shows a block diagram of another method of implementing a graphical user interface, in accordance with one embodiment of the present technology.
Figure 4B:
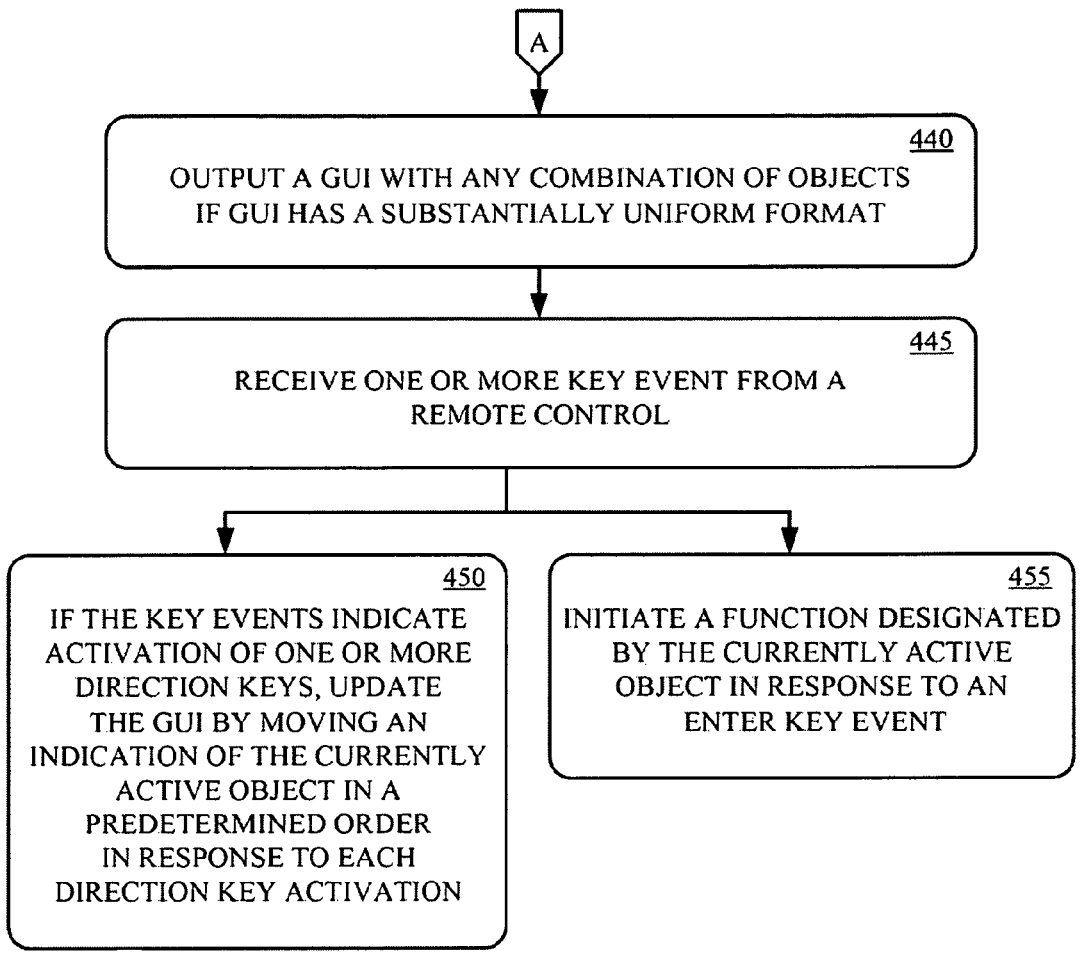

Referring now to FIGS. 4A and 4B, another method of implementing a graphical user interface, in accordance with one embodiment of the present technology is shown. At 405, a video processing and control unit 160, 170 receives data for generating a given instance of a graphical user interface. The graphical user interface 190 may include any combination of menus, sub-menus, icons, application windows, thumbnails, control bars and/or the like. The graphical user interface also includes a widget such as a cursor.

At 410, the given video processing and control unit 160, 170 determines whether the graphical user interface 190 presents objects in a substantially ordered format or if the objects are presented in an asymmetric format. For example, a substantially ordered format presents objects in the form of menus, sub-menus, icons, thumbnails or the like in a regular set of rows and columns. In an asymmetric format the objects may be arranged in any order. If the given instance of the graphic user interface 190 is asymmetric, the given instance of the graphical user interface 190 is output by the video processing and control unit 160, 170 on the display 150 along with a widget such as a cursor, at 415. The widget may be customizable by the user, may be based upon the context of the graphical user interface, and/or the like. For example the user may change the symbol used for the cursor, its size and the like. In another example, the cursor may be by default a simple pointer symbol, such as a hand or arrow, for selecting objects. The cursor may change to a magnifying symbol when the objects are relatively small and/or dense and the objects proximate the magnifying symbol may be enlarged for easier recognition by the user.

At 420, the given video processing and control unit 160, 170 receives one or more key events from the remote control 140 in response to activation of one or more keys of the remote control 140 by a user. If the one or more key events indicate activation of one or more directional keys, the given video processing and control unit 160, 170 updates that graphical user interface 190 by moving the widget a fixed distance in response to each discrete activation of a given directional key in a given direction corresponding to each activation of the given directional key, at 425. In addition, if the one or more key events indicate that a given directional key is being held down, the widget may move in a continuous motion in the given direction corresponding to the given directional key. Again, if the widget is moved to a predetermined area on the display in response, the graphical user interface may also be updated to display one or more menus, sub-menus, icons, thumbnails and/or the like associated with the predetermined area.

At 430, if the one or more key events indicate activation of an "enter" key, the given video processing and control unit 160, 170, generating the asymmetric formatted graphical user interface 190, determines if the widget is proximate the location of a menu item, icon, thumbnail or the like object of the graphical user interface 190. If the widget is proximate an object, the video processing and control unit 160, 170 may initiate the function designated by the given object in response to the "enter" key event, at 435. If the video processing and control unit 160, 170 determines that the widget is not proximate an object, the key event can be ignored. Likewise, the layout of the graphical user interface may be customized by activating the "enter" key in combination with activation of one or more directional keys when proximate a widget as described above with reference to FIG. 2.

If the arrangement of objects of the given instance of the graphic user interface 190 is substantially uniform, the given instance of the graphical user interface 190 is output by the video processing and control unit 160, 170, on the display 150, at 440. At 445, the given video processing and control unit 160, 170 receives one or more key events from the remote control 140 in response to activation by a user. If the one or more key events indicate activation of one or more directional keys, the given video processing and control unit 160, 170 updates the substantially uniformly formatted graphical user interface 190 by moving an indication of a currently active object in a predetermined order in response to each discrete activation of a given directional key, at 450. For example, the graphical interface 190 initially presents a set of objects wherein a predetermined one of the objects is highlighted. In response to each activation of the directional keys, the highlighting moves from object to object in a predetermined sequence based on the particular sequence that the directional keys are activated.

At 455, if the one or more key events indicate activation of the "enter" key, the given video processing and control unit 160, 170, generating the substantially uniform formatted graphical user interface 190, will initiate the function designated by the currently active object in response to the enter key event.

By determining if the graphical user interface 190 presents objects in a substantially ordered format or if the objects are presented in an asymmetric format at 410, the method can automatically switch between cursor mode 415-435, and conventional object-to-object mode 440-455. The method may also easily switch between cursor mode and object-to-object mode in response to an input from a user, such as one or more predetermined key events. Switching between cursor mode and object-to-object mode may be advantageous because sometimes it is easier and/or faster to navigate from object to object on the television 110, while other time it may be easier and/or faster to navigate directly to that object.

As the graphical user interfaces on televisions get increasingly complicated, embodiments of the present technology advantageously provide improved techniques for navigating between objects in the graphical user interfaces. The techniques implement the concept of a cursor or other similar widget which is controlled by certain key events on any remote controller, as opposed to a special or separate device. The techniques allow smooth and intuitive navigation around the graphical user interfaces of televisions and other content sources. The techniques further allow for more asymmetrical and flexible presentation of information in the graphical user interfaces. The techniques enable backward compatibility of existing televisions and content sources. Furthermore, the embodiments of the present technology may be implemented through a software upgrade to existing televisions and/or other content sources.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A method comprising:
    outputting a graphical user interface including a widget and any combination of objects on a video display;
    receiving one or more key events from a remote control;
    updating the graphical user interface by moving the widget a fixed distance in response to each direction key activation, if the one or more key events indicate activation of one or more direction keys;
    responsive to a determination that the one or more key events indicates activation of an enter key, determining if the widget is proximate a first object of the graphical user interface; and
    only responsive to a determination that the widget is proximate the first object, initiating a function designated by the first object in response to the activation of the enter key and otherwise not initiating the function designated by the first object;
    wherein the outputting of the graphical user interface to include the plurality of objects is executed if the graphical user interface has a substantially uniform format;
    updating the substantially uniform formatted graphical user interface by moving an indication of a currently active object in a predetermined order in response to each direction key activation if the one or more key events indicate activation of one or more direction keys; and
    initiating a function designated by the currently active object in response to the activation of the enter key if the widget is proximate the given object in the asymmetric formatted graphical user interface.

2. The method according to claim 1, further comprising ignoring the enter key event if the widget is not proximate any object.

3. The method according to claim 1, wherein updating the graphical user interface further comprises updating the graphical user interface by moving the widget in a continuous motion in a given direction corresponding to a given direction key in response to the given direction key being held down, wherein the distance that the widget moves is proportional to the time that the directional key is held down.

4. The method according to claim 1, wherein the widget comprises a cursor.

5. The method according to claim 1, wherein the objects include one or more of a menu item, a sub-menu item, an icon, an application window, a thumbnail, and a control bar.

6. The method according to claim 1, wherein the function comprises selecting or controlling operation of a content source selected from a group consisting of the a set top box, a satellite receiver, a digital video disk player, a digital video recorder, a video cassette recorder, a game console, and a hard disk drive.

7. The method according to claim 1, further comprising updating the graphical user interface to display one or more additional objects in a predetermined area when the widget is moved to the predetermined area.

8. A system comprising:
    a video display;
    a remote control for generating key events in response to activation of one or more keys by a user, wherein the keys include a plurality of direction keys and an enter key;
    a video processing and control unit for generating a graphical user interface including a widget and any combination of objects on the video display, wherein the widget moves in the graphical user interface, in response to direction key events, wherein the video processing unit accesses a computer readable medium bearing instructions to cause the video processing unit to execute logic comprising:
    determining whether the graphical user interface presents the plurality of objects in a substantially ordered format or an asymmetric format;
    (a) responsive to a determination that the graphical user interface has an asymmetric format:
        outputting the graphical user interface include the widget and the plurality of objects;
        updating the asymmetric formatted graphical user interface by moving the widget in response to each direction key activation if the one or more key events indicate activation of one or more direction keys;

determining if the widget is proximate an object of the asymmetric formatted graphical user interface if the one or more key events indicate activation of an enter key; and initiating a function designated by a given object in response to the activation of the enter key if the widget is proximate the given object in the asymmetric formatted graphical user interface;

(b) responsive to a determination that the graphical user interface is in a substantially uniform format:

outputting the graphical user interface include the plurality of objects;

updating the substantially uniform formatted graphical user interface by moving an indication of a currently active object in a predetermined order in response to each direction key activation if the one or more key events indicate activation of one or more direction keys; and initiating a function designated by the currently active object in response to the activation of the enter key if the widget is proximate the given object in the asymmetric formatted graphical user interface.

9. The system of claim 8, wherein the video display comprises the video processing and control unit.

10. The system of claim 8, further comprising a content source including the video processing and control unit.

11. The system of claim 10, wherein the content source comprises a set top box, a satellite receiver, a digital video disk player, a digital video recorder, a video cassette recorder, a game console, or a hard disk drive.

12. The system of claim 8, wherein the graphical user interface includes a plurality of objects including one or more of a menu, a menu item, a sub-menu, a sub-menu item, an icon, an application window, a thumbnail, and a control bar.

13. The system of claim 8, wherein the widget comprises a cursor.

14. The system of claim 8, wherein the function comprises selecting or controlling operation of the video display or a content source.

15. One or more computing device readable media which are not carrier waves and which include computing device executable instructions which when executed by one or more processors cause one or more devices to implement a method comprising:

outputting a graphical user interface include a widget and a plurality of objects on a display;

receiving one or more key events from a remote control;

responsive to a determination that the widget is proximate a given object, initiating a function designated by the given object in response to the activation of the enter key;

determining if the graphical user interface presents the plurality of objects in a substantially ordered format or an asymmetric format;

outputting the graphical user interface include the widget and the plurality of objects if the graphical user interface has an asymmetric format;

updating the asymmetric formatted graphical user interface by moving the widget in response to each direction key activation if the one or more key events indicate activation of one or more direction keys;

determining if the widget is proximate an object of the asymmetric formatted graphical user interface if the one or more key events indicate activation of an enter key; and initiating a function designated by a given object in response to the activation of the enter key if the widget is proximate the given object in the asymmetric formatted graphical user interface.

16. The one or more computing device readable media implementing the method according to claim 15, further comprising:

updating the graphical user interface by moving the widget a fixed distance in response to each direction key activation, if the one or more key events indicate activation of one or more direction keys; and responsive to a determination that a received key event indicates activation of an enter key, determining if the widget is proximate an object of the graphical user interface.

17. The one or more computing device readable media implementing the method according to claim 15, further comprising:

outputting the graphical user interface include the plurality of objects if the graphical user interface has a substantially uniform format;

updating the substantially uniform formatted graphical user interface by moving an indication of a currently active object in a predetermined order in response to each direction key activation if the one or more key events indicate activation of one or more direction keys; and initiating a function designated by the currently active object in response to the activation of the enter key if the widget is proximate the given object in the asymmetric formatted graphical user interface.

18. The one or more computing device readable media implementing the method according to claim 17, wherein:

the plurality of objects of the asymmetric formatted graphical user interface include one or more of a menu, a menu item, a sub-menu, a sub-menu item, an icon, an application window, a thumbnail, and a control bar; and the plurality of objects of the substantially uniform formatted graphical user interface include a plurality of menu items arranged in a menu, a plurality of sub-menu items arranged in a sub-menu, a plurality of icons, or a plurality of thumbnails.

19. The one or more computing device readable media implementing the method according to claim 17, wherein the widget comprises a cursor.

* * * * *

UNITED STATES PATENT AND TRADEMARK OFFICE
CERTIFICATE OF CORRECTION

PATENT NO. : 8,605,219 B2  
APPLICATION NO. : 12/269028  
DATED : December 10, 2013  
INVENTOR(S) : Victor Carvajal, Jaime Chee and Ling Jun Wong Page 1 of 1

It is certified that error appears in the above-identified patent and that said Letters Patent is hereby corrected as shown below:

Title Page, Item (75)
The third inventor's name Lin Jin Wong should be changed to --Ling Jun Wong--

Signed and Sealed this
Eighteenth Day of March, 2014

Michelle K. Lee
*Deputy Director of the United States Patent and Trademark Office*